Jan. 16, 1962 H. C. HANSEN 3,017,188

AUTOMATIC PHONOGRAPHS

Filed Oct. 8, 1957 5 Sheets-Sheet 1

Inventor:
Hans C. Hansen,
By Ernest B. Marcoux,
Attorney.

Inventor :
Hans C. Hansen,
By [signature]
Attorney.

AUTOMATIC PHONOGRAPHS

Filed Oct. 8, 1957 5 Sheets-Sheet 3

Inventor:
Hans C. Hansen,
By [signature]
Attorney.

Inventor:
Hans C. Hansen,
By [signature]
Attorney

Inventor:
Hans C. Hansen,
By [signature]
Attorney.

United States Patent Office 3,017,188

Patented Jan. 16, 1962

3,017,188
AUTOMATIC PHONOGRAPHS

Hans Christian Hansen, 14 Christiansholmsvej, Copenhagen, Denmark

Filed Oct. 8, 1957, Ser. No. 688,950
Claims priority, application Great Britain Oct. 9, 1956
25 Claims. (Cl. 274—15)

Figure 1:
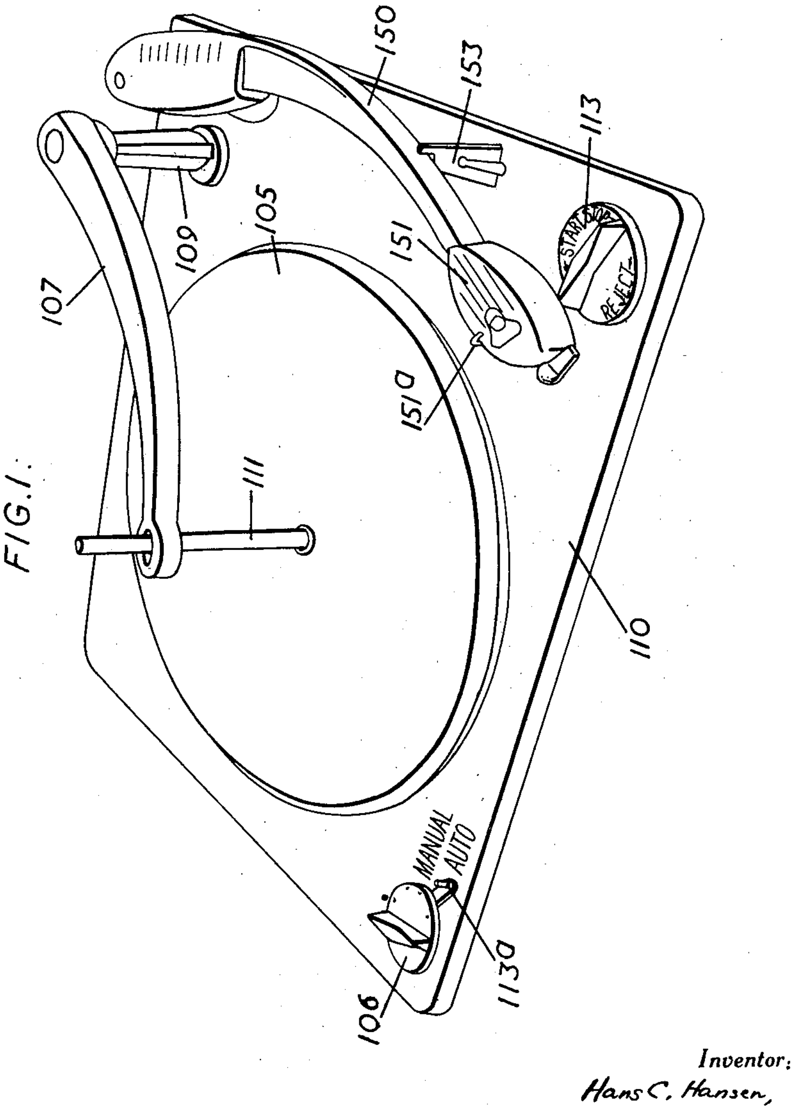

The invention relates to improvements in phonographs and more specifically record changing phonographs.

It is an object of the invention to provide a simplified control arrangement for the movement of the tone arm after each playing of a record which is reliable in operation.

It is a further object of the invention to provide a simplified friction link and cam track follower structure for causing control of the movement of the tone arm between each playing of a record.

Still a further object of the invention is to provide a cam follower structure in which the cam follower can be moved up and down, substantially perpendicular to the plane of a cam disc having tracks for controlling the in- and outward swinging of the tone arm.

Still a further object is to provide a phonograph in which the feeling of the record-size can be effectuated by moving the tone arm with an abutment to engage the edge of the next record to be supplied to the turntable.

Still a further object of the invention is to provide a control arrangement for a phonograph having a record-size feeler scheme as mentioned hereinabove in which the track follower can be allowed to follow a track to the end thereof after the tone arm has engaged the edge of the next record to be supplied to the turntable, the mutual position of the tone arm and the track follower arm thereby being displaced and in which simplified means are provided for presetting the mutual position between the tone arm and the track follower arm.

Still a further object of the invention is to provide a phonograph which alternatively can be used as a record changing phonograph and as a single player which is stopped automatically after playing of a record.

Still a further object of the invention is to provide a phonograph having separate starter means for alternative use when the phonograph is used as a record changing phonograph and used as a single player, and in which the starter means for use of the phonograph as record changing phonograph will cause the phonograph motor to be switched on as well as start of the cycle control arrangement, while the starter means for the use of the phonograph as single player will switch on the phonograph motor only, without causing the change cycle mechanism to be actuated.

Still a further purpose of the invention is to provide a phonograph having a change cycle mechanism which will be automatically actuated after playing of each record, irrespectively of the fact whether the phonograph is used as a record changing phonograph or as an automatic single player, and which will bring the pick-up arm to its stop position and switch off the phonograph motor after termination of playing of a single record as a single player as well as after playing of the last record when the phonograph is used as a record changing phonograph.

Still a further purpose of the invention is to provide a tone arm movement control structure with a track follower which can easily be disengaged from its connection with a track member during a part of the movement thereof for the purpose of by-passing certain movements such as the movement which causes the mutual position between the track follower arm and the tone arm to be preset.

Still a further object of the invention is to provide a record changing phonograph having a cycle control member in the form of a rotatably arranged cam disc which has a plurality of tracks for swinging the tone arm and in which the tone arm is swung by means of a cam track follower arrangement which can be moved relatively to the tone arm when an abutment thereon engages the next record to be supplied to the turntable so as to thereby cause the further movement of the tone arm to respond to the size of the record, and in which an improved track follower arrangement enables the selection of different tracks in the cam disc and different radial distance of the cam track follower from the centre of the cam disc when the tone arm is swung out and stopped in a most exterior position during that part of the change cycle when the record is dropped to the turntable.

Further purposes and advantages of the phonograph according to my invention will appear from the following description as it proceeds.

Figure 2:
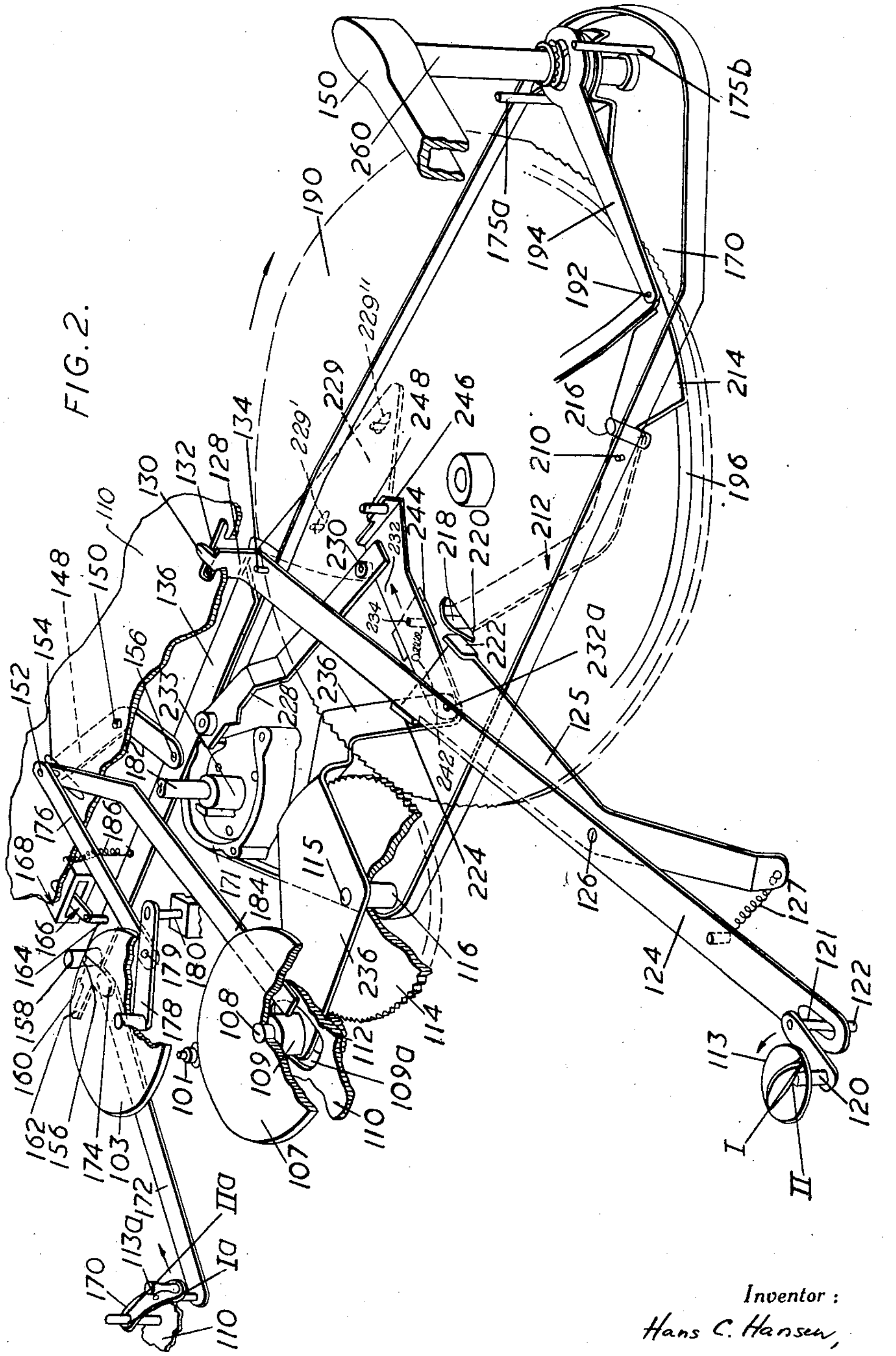
Figures 3, 4:
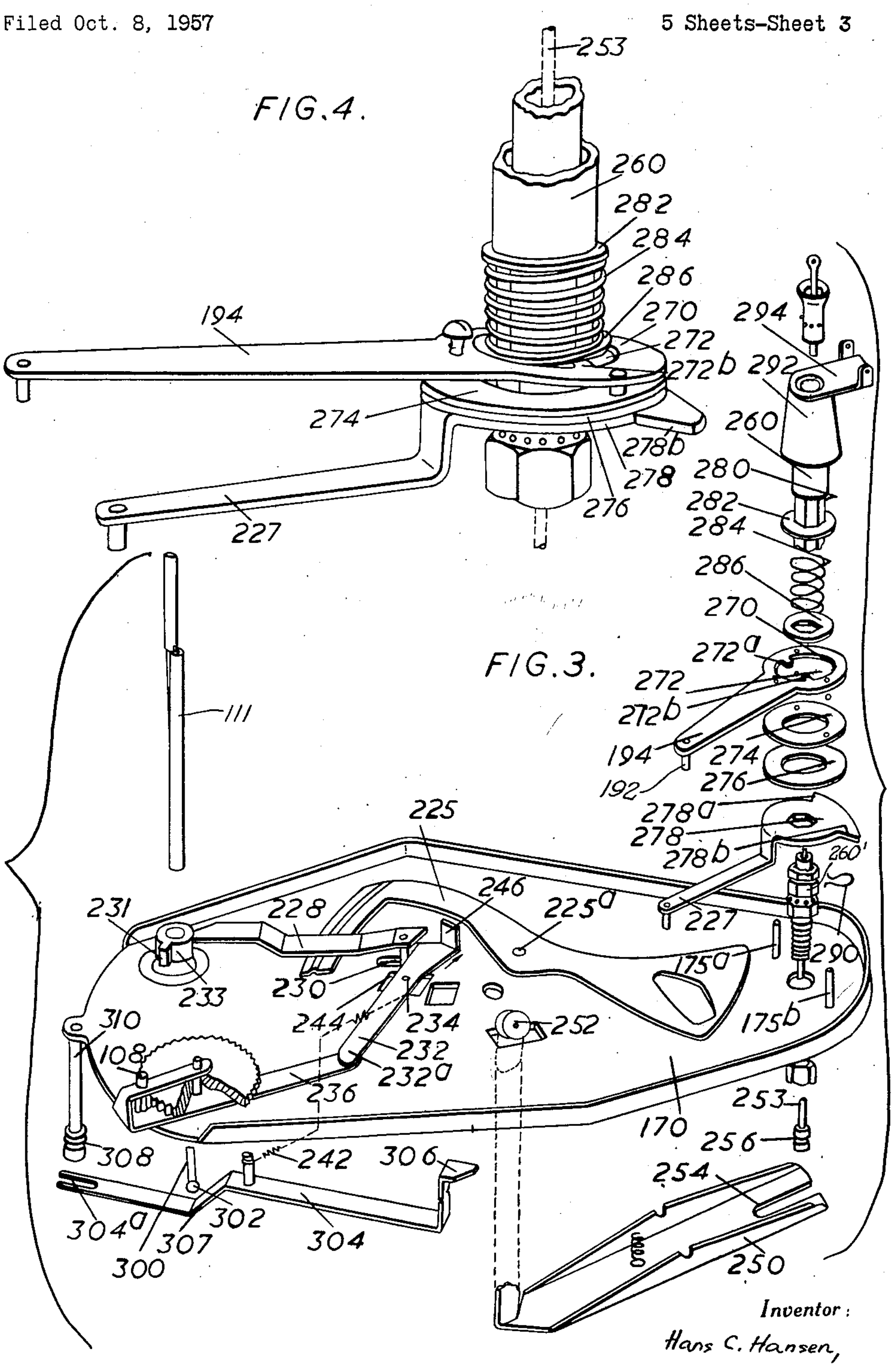
Figure 5:
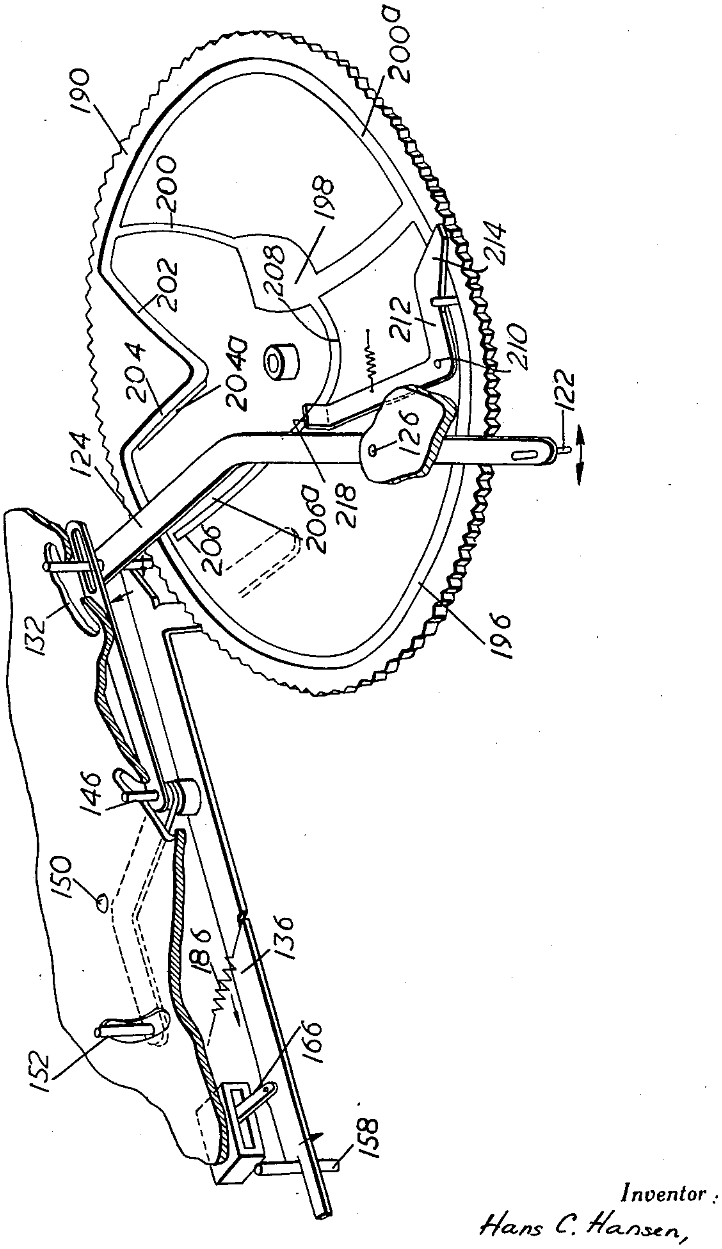
Figures 6, 7:
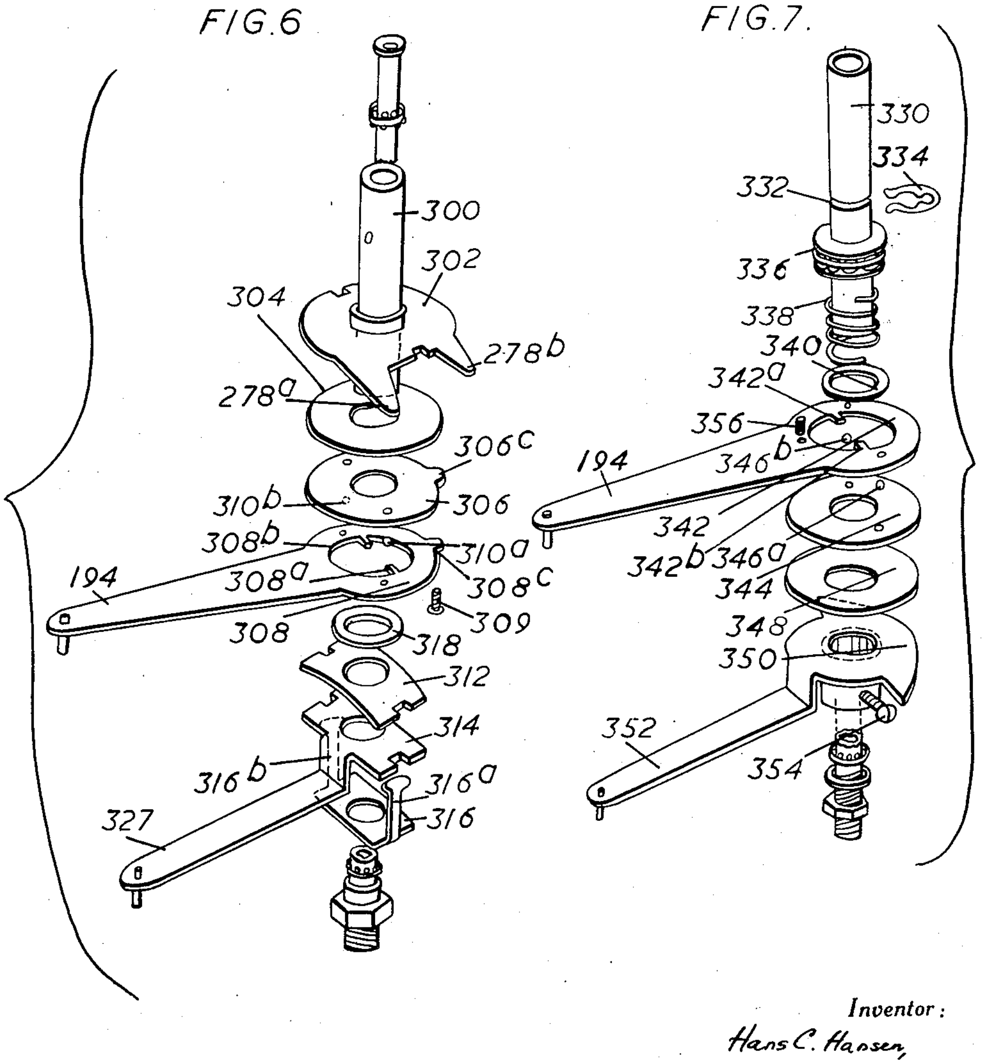

The invention will be further described with reference to the accompanying drawing in which:

FIGURE 1 is a schematic view of a phonograph according to the invention,

FIGURE 2 is a schematic, perspective view of the main parts of the phonograph with the exception of the details of the cam disc and the trip starter, FIGURE 3 is a schematic, perspective view of a bridge plate illustrating the trip starter arrangement, FIGURE 4 is a perspective view of the lower part of the tone arm spindle assembled from the parts shown in exploded view in FIGURE 3, FIGURE 5 is a perspective, schematic view of some of the parts shown in FIGURE 2 according to a modified embodiment and illustrating the cam disc, FIGURE 6 is an exploded view of a modified embodiment of the structure shown in FIGURE 4, and FIGURE 7 is a further exploded view of a still further embodiment of the structure shown in FIGURE 4.

As in my British Patent No. 757,379 as in my corresponding U.S. patent application Ser. No. 225,946 as well as in the specification of my British patent application No. 22,817/55 and the corresponding U.S. patent application Ser. No. 602,589, the main part of the phonograph is the cam disc which in the following description will be assumed as being provided with cam configurations as disclosed in the first embodiment disclosed in the specification of British application No. 22,817/55 and the corresponding U.S. patent application though the invention is not limited to this specific embodiment of the cam disc as other modifications are possible within the scope of the invention described in the complete specification accompanying my British application No. 700/56 which corresponds to my U.S. application Ser. No. 633,288. The disclosure of these copending applications is hereby made part of the disclosure of the present application.

Referring now to the drawings the magazine phonograph according to the present invention comprises a base plate or chassis 110, a tone arm 150 having a pick-up head 151 including stylus means, and a centre spindle 111 for supporting a stack of records to be released in sequence from a support on the centre spindle to be fed down to the playing position on the turntable 105. The turntable is driven by a motor (not shown) of which only the driving spindle 101 is shown in FIGURE 2. The driving spindle has a plurality of steps which in a manner which does not form part of the present invention can be selectively engaged by means of a driving friction wheel 103 (FIGURE 2) which is interposed between the driving spindle and for example the rim of the turntable and by suitable speed selector means can be caused to drive the turntable at a plurality of selectable speeds; the selector knob is designated by 106 in FIGURE 1 and is located at the left hand front corner of the chassis 110.

In the embodiment shown the centre spindle 111 (FIGURE 1) is of the type having a top portion which is off-set relatively to the lower portion which terminates in an upwardly facing shoulder from which the records are released in sequence by being pushed sidewardly controlled by a swingingly arranged lever movable in a slot in the spindle 111. This type of spindle forms no part of the present invention and therefore will not be described in greater detail, especially since spindles of this type are known to those skilled in the art.

In order to stabilize the stack of records supported on the shoulder of the spindle in parallel relationship relative to the turntable, a swingingly arranged stabilizer or ballast arm 107 (FIGURE 1) is provided having a spindle which can slide in a bearing 109 so as to allow the ballast arm 107 to be lifted by hand and swung away for the purpose of loading or unloading the spindle or the turntable. In the operative position of the parts of the phonograph the ballast arm 107 is caused to rest on the top of the stack of records (not shown) supported on the spindle 111. The phonograph further has a supporting post 153 on which the tone arm 150 rests when the phonograph has been brought to its stop position. Furthermore, at the right hand front corner of the chassis 110 there is provided a start-, stop-, and reject-control knob 113. Furthermore there is provided at the left hand front corner of the chassis a movable control knob 113*a* which can be shifted between two positions, one position for allowing automatic operation of the phonograph and another position for allowing manual operation of the phonograph.

As shown in greater detail in FIGURE 2 the mechanism for controlling the movements of the tone arm is mounted on a supporting bridge member 170 which, as disclosed in the specification of my copending British patent application No. 700/56 and the corresponding U.S. Ser. No. 633,288, is secured below the chassis 110. At the right hand end, the bridge 170 is secured to chassis 110 by means of a pair of posts 175*a*, 175*b*. At the left hand end the bridge has a member 171 at the bottom of which there is rigidly secured a hollow spindle 182 which forms a stationary spindle for the turntable 105 and in the longitudinal hollow bore of which the lower end of the centre spindle 111 is received. The member 171 has a cavity for receiving a ball bearing to support the turntable. Further the member has a plurality of screw holes for receiving screws by means of which the other end of the bridge 170 is secured to the chassis.

In the embodiment shown there is provided for the purpose of driving the control mechanism for the phonograph during the change cycle, a gear mechanism including a friction gear wheel 107 which, in addition to the gear wheel 103, can be made to engage the motor spindle 101, preferably against a predetermined step thereon, so as to cause the change mechanism to be driven at the same predetermined speed irrespective of the turntable speed as selected by the selector knob 106. The friction gear wheel 107 is secured on a shaft 108 which is rotatably arranged in a bushing 109 on a swingingly arranged member 236. At the lower end of the shaft 108 there is provided a pinion 112 which is in constant engagement with another pinion 114 which rotates on a spindle 115 supported in a bearing 16 on the bridge 170. The member 236 is also arranged to swing about the spindle 115. In the orbit of the bearing 109 the chassis 110 has an elongated slot 109*a* in order to permit the bearing to swing unobstructed when the arm 236 swings.

The start-, stop-, and reject-control knob 113 is rotatable and secured on a shaft 120 which, by means of a pin- and slot-connection 121, 122, is connected with a start-, stop-, and reject-arm 124 which is swingingly arranged about a pin 126 on the chassis plate. The other end of the arm 124 is bent up perpendicularly into the arm at 128 to extend vertically and has a horizontally extending lip 130 which can move in a slot 132 in the chassis plate 110 when the arm 124 is caused to swing in either direction. At the rear end, the arm 124 further has a downwardly extending pin 134 by means of which the movement of the arm 124 can be transferred to a switch control arm 136. The switch control arm 136 is connected by means of a pin 146 to a two-armed lever 148 which can swing about a pin 150 and which at the other end has a pin 152 extending through a slot 154 in the chassis 110.

The left hand end of the switch control arm 136 is guided in an annular slot 156 on a pin 158 which is rigidly secured below the chassis plate. Further the rear edge of the switch control arm 136 is cut away at 160 to form a first step and at 162 to form a second step. Furthermore the switch control arm 136 has a pin 164 which engages with operating arm 166 for closing and opening a switch generally designated by 168.

The knob 113*a* for causing manual control of the phonograph is arranged on a swingingly arranged arm 170 which can move between two positions referred to by I*a* and II*a*. In order to transfer the movement of the control knob 113*a* to stop the phonograph by moving the switch control arm 136, the end of the arm 170 is connected through a lever 172 with the switch control arm 136 by means of a link 174.

The top of the pin 152 is connected with a lever 176 which by means of a pin 179 is connected to a lever 178 which can swing about a stationary post 180. Further the top of the pin 152 is connected to a lever 184 which is arranged to slide on the top of a chassis plate 110 and is guided by a pin- and slot-connection. The end of the lever 184 terminates adjacent the bearing 109 in a manner which will be understood more fully from the description of the mode of operation. A spring 186 is interposed between the switch control arm 136 and the stationary parts such as the switch 168 and pulls the arm 136 towards the left so as to engage the end of one or the other of the steps 160 or 162 against the pin 158 in the bottom of the slot 156 thereof.

As previously mentioned the main part of the phonograph is the cam disc generally referred to by 190. A basic feature of the cam disc is that it is capable of moving the tone arm by means of a cam follower pin 192 on a cam follower arm 194 through a path which causes the tone arm to measure the size of the next record to be supplied from the centre spindle by engaging an abutment 151*a* provided on the pick-up head 151 (FIGURE 1), against the edge of this record. When the tone arm 150 measures the size of a record the angle between the cam track follower arm 194 and the tone arm 150 will be changed so as to cause the cam track follower arm 194 to be moved with the cam follower pin 192 across a surface portion of the cam disc 190 in another level than that assumed by the cam follower pin 192 when it follows the tracks in the surface of the cam disc 190 in the case when movement of the tone arm 150 is not obstructed by engagement of a record on the centre spindle 111. If the tone arm 150 is not caused to measure the size of a record, i.e. if there is no record on the centre spindle 111, the angle between the cam track follower arm 194 and the tone arm 150 will not be changed, and in this event the pin 192 will follow a so-called stop track 196, in the top surface of the cam disc 190 which will lead to the stop position.

As will be appreciated from the description of the mode of operation, the invention from one aspect also provides a record changing phonograph which can be used as a single player which is automatically stopped after playing of a record.

The cam disc has, as shown in FIGURE 5, in addition to the stop track 196, a playing recess 198 in which the stop track 196 terminates and in which the track follower pin 192 can move freely during the playing of a record. From the other end of the stop track 196 there extends an outwardly leading track 200 which, adjacent the periphery of the cam disc 190 continues in an inwardly leading track 202. At the interior end, this track 202 continues in an outwardly leading track 204 having a sloping wall 204*a*. Opposite the track 204 there is arranged an inwardly leading track 206 having a sloping wall 206*a*. This track 206 is the first of a landing track arrangement which continues in a track 208 which merges in the playing recess 198.

A stop arm 212 is swingingly arranged on cam disc 190 about a pin 210. One end 214 of the stop arm extends through a slot 216 (FIGURE 2) on the top surface of the cam disc 190 and extends further across the stop track adjacent the inlet to the playing recess 198. When the track follower pin 192 during its passage in the stop track 196 engages the end 214 of the stop arm 212 the latter will be swung anti-clockwise. The rear end of the stop arm 212 has a flap 218 which extends up through a slot 220 (FIGURE 2) in the cam disc 190 and is operable to engage a flap 222 (FIGURE 2) on an arm 125 which forms a part of the start-, stop-, and reject-arm 124, the latter being pivotally secured to arm 125 by pin 126 and normally held in the position as shown in FIGURE 2, by means of a spring 127 which swings the arm 125 to such a position relative to the arm 124 in which a flap 224 provided on arm 125 engages the left hand edge of the arm 124.

The invention further provides a sub-assembly mounted on the bridge 170, forming a trip starter arrangement as is more specifically shown in FIGURE 3, including a trip starter arm 228 which is mounted for swinging as well as reciprocal movement. The trip starter arm 228 has a pin 230 (FIGURE 3) which extends down through a slot in the bridge 170 below which the pin 230 is secured to a triangular plate member 229 (FIGURE 2) which is guided for reciprocal movement by means of a pair of pin- and slot-connections 229′ and 229″ (FIGURE 2) below the bridge 170. The left hand rear corner of the plate member 229 is so arranged relatively to the pin 134 on the start- and stop-control arm 124 that when this arm, under manual operation of the control knob 113, is caused to swing, the pin 134 will engage the plate 229 and cause it to move towards the right, as viewed in FIGURE 2. The normal movement of the trip starter arm 228 takes place when it is engaged at its front end by a lug 231 (FIGURE 3) on the rotating turntable boss 233. Normal anti-clockwise swinging of the trip starter arm 228 is caused by a trip starter control arm 225 (FIGURE 3) which in its turn, is caused to swing about a pin 225*a* on the bridge by means of a trip starter actuating arm 227 (FIGURES 3 and 4) rigidly secured to the tone arm spindle 260 so as to follow the tone arm 150 when the stylus thereof follows the sound track of a record. In a well-known manner the increased inward movement of the tone arm 150 when the stylus enters the outlet track on the record, causes the trip starter arm 228 to be engaged by the rotating lug 231 on the turntable boss 233.

In the present embodiment the trip starter mechanism includes a link system comprising a lever 232 (FIGURE 3) swingingly arranged about a pin 234. The lever 232 is by means of a link 232*a* connected with an end of the swingingly arranged lever 236 on which the change cycle driving gear wheel structure is supported. A spring 242 is interposed between the pin 234 and some other suitable fixed point. The pin 234 extends through an aperture 244 in the bridge 170 so as to allow the arm 232 to move freely within a limited range of movement which comprises swinging as well as reciprocal movement. The rear end of the arm 232 has a flap 246 which is adapted to be engaged by an abutment 248 (FIGURE 2) on the underside of the cam disc 190.

The cam disc 190 (FIGURES 2 and 5) further has cam portions (not shown) capable of controlling the raising and lowering of the tone arm by means of a tiltable raising lever 250 (FIGURE 3) which has a roller 252 that engages these cam portions. The rear end of the raising lever is slotted at 254 and is capable of engaging a small bushing 256 on a screw-threaded end of a pin 253 which extends up through the tone arm spindle 260. The position of the bushing 256 on the pin 253 can be adjusted so as to set the necessary level to which the pick-up arm is intended to be lifted. The cam portions controlling the raising and lowering comprises an inclined surface (not shown) along which the roller 252 on the raising lever 250 passes when the tone arm 150 is lowered to engage the stylus with the sound track on a record. In this position the abutment 248 on the cam disc will engage the flap 246 on the arm 232, and due to the tension of the spring (not shown) which presses the roller 252 on the raising lever 250 against the cam portions controlling the raising and lowering of the pick-up this results in drawing the arm 232 in the direction of the arrow shown in FIGURES 2 and 3. Due to the play of the pin 234 in the aperture 244 this movement is sufficient to allow the cam gear arm 236 to be swung to disengage the cam gear friction wheel 107 from the motor spindle 101.

The invention also provides for an improved friction link between the cam follower arm 194 and the tone arm spindle 260 which enables the cam follower arm 194 to swing relative to the tone arm spindle against friction as well as to move vertically so as to allow the desired movement of the cam track follower pin 192 when the cam follower pin 192 climbs the sloping wall 204*a* of the track 204 and descends along the sloping wall 206*a* of the track 206.

For this purpose the track follower arm 194 is tiltable against resilient action and so associated with the tone arm 150 as to swing relative thereto against friction.

As shown in the exploded view in FIGURE 3 the cam follower arm 194 has a portion 170 which is in the form of a washer having an aperture 272 for the passage of the tone arm spindle 260. The portion 270 is coupled to a friction disc structure which includes a disc 274 concentric with the tone arm 150, a friction washer 276, and a second disc 278 which forms a part of the trip starter actuating arm 227. The disc 278 is prevented from rotating relative to the tone arm spindle 260. In the embodiment of FIGURE 3 the cross section of the lower end 260′ of the tone arm spindle 260 is polygonal, and the disc 278 has a correspondingly shaped hole.

As further shown in FIGURE 3, the upper portion of the tone arm spindle has a downwardly facing shoulder 280 against which a washer 282 engages. Below the washer there is provided a spring 284 which in its turn presses a further washer 286 down to engage a pair of flaps 272*a*, 272*b* extending into the aperture 272 of the washer part 270 associated with the cam follower arm 194.

The coupling between the cam follower arm structure 194, 272 and the disc 274 of the friction link structure is made in the form of a pair of coupling members such as a pair of balls engaging in pairs of axially aligned holes in the washer portion 270 and the disc 274 respectively. These coupling members or balls may be arranged diametrically opposite of the tone arm spindle 260, the flaps 272*a*, 272*b* being arranged laterally disposed thereto in the direction of the extending cam follower arm 194.

It will be appreciated that when the parts are pressed together by means of the spring 284, the cam follower arm 194 can be tilted slightly up and down against a resilient force which is determined between the distance between the line connecting the ball members and the line connecting the flaps 272*a*, 272*b* and the tension of the spring which in its turn also presses the discs 274, 276, 278 forming the friction link structure against each other. In the embodiment of FIGURE 3 the lower end of the tone arm spindle 260 is provided with a washer or spring clip 290 forming a stop for the disc 278, but it will be appreciated that the disc 278 may be rigidly secured on the tone arm spindle 260.

On the top of the tone arm spindle 260 there is secured, for example by clamping or in any other suitable way, a bushing 292 on the top of which there is provided a bracket 294 on which the tone arm is supported adapted to be lifted and lowered.

The cam disc 190 is further adapted to control the drop of the records. Since as previously mentioned neither the construction of the centre spindle 111 nor the drop control mechanism forms part of the present invention this part of the mechanism will be described very briefly only. In FIGURE 3 the lower end of the drop control arm included in the centre spindle is designated by 300. This has a roller 302. The control movement of this arm 300 is controlled by a reciprocal member or record drop control arm 304, the right hand end of which is provided with a portion 306 which extends up through an aperture in the bridge 170 and is adapted to be engaged by a cam member (not shown) on the cam disc 190. The left hand end of the record drop control arm 304 is slotted at 304*a* and engages in a groove 308 on a pin 310 which extends downwardly from the bridge 170. When the record drop control arm 304 is pushed towards the left the roller 302 runs up on a sloping surface 307 of the drop control arm 304.

Preferably the same spring 242 which controls the movement of the arm 232 is used for controlling the movement of the drop control arm 304 back to its neutral position after the record has been dropped.

The operation of the phonograph as described hereinabove is substantially as follows, reference being made to FIGURES 2, 3, 5, and 6.

It is assumed that the parts in the position shown in FIGURE 2 are in the position of rest to which they have been brought after the phonograph has been stopped automatically.

The pin 134 at the rear end of the start control arm 124 engages in a triangular notch in the front edge of the switch control arm 136 in such a manner that when the start control arm 124 is rotated clockwise, it will pull the switch control arm towards the right, while on the other hand when the switch control arm 136 is moved in the same direction, i.e. towards the right by means of the manual start control knob 113*a*, this movement will not be transmitted to swing the start control arm.

Assuming now that the phonograph is to be used as a record changing phonograph, the starting takes place by rotating the control knob 113 anti-clockwise and then releasing the knob. This will cause the start control arm 124 to be swung clockwise in such a manner that the pin 134 will pull the switch control arm 136 towards the right.

In the position of rest, the abutment 248 which extends below the cam disc 190 engages the flap 246 on the arm 232, and as previously explained this causes the cam gear structure supporting arm 236 to be swung to a position in which the gear wheel 107 is disengaged from the motor spindle 101.

When the start control arm 124 is swung clockwise this will cause not only the arm 136 to be pulled towards the right but the pin 134 will also engage the left hand rear corner of the plate member 229 to move the same rectilinearly towards the right. Since this plate is connected with the trip starter arm 228, the pin 230 will engage the arm 232 and cause this arm to move so as to release the abutment 246 from the abutment 248. Simultaneously the movement of the switch control arm 136 will be sufficient to bring this arm 136 to a position in which the second step 162 on the switch control arm engages the narrow part of the pin 158 in the groove 156 thereof, and during this movement the control arm 166 for the switch 168 will be thrown over to close the motor switch. The swinging movement of the start control arm 124, in order to engage the plate 229 and cause the swinging of the arm 232 as herein described, is somewhat larger than necessary in order to move the switch control arm 136 to the switch-on position with the result that initially the arm 148 is also swung. This causes the arm 184 to be pushed forwardly to engage the bearing 109 and thereby initially prevents the gear wheel 107 from engaging the motor spindle. Simultaneously the arm 176 is pushed forwardly which swings the arm 178 to a position in which the gear wheel 103 engages the motor spindle. When the control knob 113 is released, the spring 186 will pull the switch control arm 136 slightly back until the shoulder adjacent the end of the step 162 engages the narrow portion of the pin 158 which will swing the arm 148 back clockwise sufficiently to release the end of the arm 184 from the bushing 109 so that the spring 242 now causes the gear wheel 107 to engage the predetermined step on the motor spindle. Due to the "floating suspension" of the arm 232 and the direction in which the spring 242 pulls, the arm 232 will, when it is released, be in a position in which the flap 246 is free of the abutment 248 extending below the cam disc so that the engagement of the driving gear mechanism for the cam disc 190 will cause the cam disc to be rotated. The return stroke of the arm 148 simultaneously causes a return stroke of the arm structure 176, 178. This return stroke is, however, not sufficient to disengage the main driving gear wheel 103 which will remain engaged with the driving spindle 101 and the rim of the turntable so as to cause the turntable to be driven. During the rotation of the cam disc 190, the pick-up arm 150 will initially be raised from the supporting post 153 whereafter the cam follower pin 192 will be guided either, if the phonograph is started from the neutral position, in a by-pass track 200*a* (FIGURE 5), or, if the phonograph is started after a record has been played, outwardly through the track 200.

If the cam disc 190 is started with the parts in the neutral position and the track follower passes through the by-pass track 200*a*, then, the pick-up arm 150 will remain in its exterior position. Then the cam follower pin 192 will be guided inwardly in the track 202 until the abutment 151*a* (FIGURE 1) engages the edge of the next record to be supplied from the centre spindle 111 to the turntable. At this point of the movements the further movement of the tone arm is interrupted, but the cam follower pin 192 follows the track 202 to the interior end thereof with the result that the angle between the cam follower arm 194 and the tone arm 150 will be changed depending on the size of the record which is engaged. This change takes place by overcoming the friction between the discs 274, 276, and 278 of the friction link, the disc 274 being caused to rotate with the arm 194 and its disc 270 by the coupling members between these discs.

Thereafter the cam follower pin 192 moves out into the track 204 which swings the tone arm 150 outwardly until an abutment 278*a* on the disc 278 (FIGURE 3) connected with the tone arm spindle 260 engages the stationary post 175*a*. At this point the further outward movement of the tone arm is interrupted. Due to the existence of the sloping wall 204*a* of the track 204 the track follower pin 192 is not caused to follow the track 204, but the track follower pin 192 can climb the inclined wall 204*a* by tilting the lever 194 against the resilient action of the spring 284, i.e. the cam follower pin 192 climbs the wall 204*a* at a point along the track 204 which is governed by the size of the record so as to approach the landing track arrangement 206, 206*a* at a radial distance from the centre of the cam disc 190 governed by the size of the record. The track follower pin 192 then passes over the surface of the cam disc between the tracks 204 and 206. During this part of the rotation of the cam disc the record drop control arm 304 is actuated to release the record which has been tested which takes place when the tone arm is in its most exterior position.

When the track follower pin 192 enters the initial part of the landing track arrangement it descends in the track 206 along the sloping wall 206*a* thereof, the cam follower arm being biased downwardly by means of the spring 284.

The cam follower pin 192 then follows the landing track 208 which merges in the playing recess 198 and the tone arm 150 is then landed with its stylus to engage the initial sound track of the record correctly.

During the last part of the rotation of the cam disc 190, the abutment 248 engages the flap 246 and causes movement of the arm structure 232 resulting in an anti-clockwise swinging of the arm 236 which disengages the driving gear 107 from the motor spindle 101. In the position of rest of the cam disc 190 during playing of a record the cam disc is positioned by the engagement of the roller 252 and the pair of flaps 264.

If during the change cycle the inward movement of the tone arm 150 is not obstructed by engagement of the edge of a record on the centre spindle, then the mutual relative position between the cam follower arm 194 and the tone arm 150 which is preset after each playing of a record by the fact that when the tone arm is moved outwardly under control of the cam follower pin 192 through the track 200, the outward movement of the tone arm is stopped by engagement between the flap 278*a* and the stationary post 175*a* while the cam follower pin 192 must follow the track 200 to its exterior end, will not be changed when the cam follower pin 192 moves inwardly through the track 202. The pre-set position between these two arms 150, 194 is so arranged that when the mutual angle is not changed this will result in the cam follower 192 being moved out through the entire length of the track 204 to enter the stop track 196 with the result that, if no record has been engaged, the track follower 192 will follow through the stop track and at the last part thereof engage the end 214 of the stop arm 212 which is thereby swung anti-clockwise as shown in FIGURE 2 so that its abutment 218 engages the abutment 222 on the arm 125 associated with the stop arm 124 and causes the latter to be swung anti-clockwise. This will cause the pin 134 to engage the inclined wall of the notch at the front end of the switch control arm 136 which thereby causes control arm 136 to swing anti-clockwise about the pin 146. This releases the right hand end of the step 162 from its engagement with the pin 158, and the spring 186 will then pull the switch control arm 136 towards the left and open the switch. Simultaneously the arm 148 will be swung clockwise which again causes the arm structure 176, 178 to be swung sufficiently to disengage the main driving gear wheel 103 from the motor spindle 101 so that the phonograph will be stopped.

The phonograph can be stopped in a similar manner under manual control by rotating the control knob 113 clockwise which causes the same movement of the arm 124.

The reason why the resiliently arranged arm 125 is interposed between the arm 124 and the stop abutment 218 on the cam disc is to provide for safety against clamping of the parts in case of faulty operation for example if the operator simultaneously with having initiated the stop rotates the control knob 113 in a clockwise direction and retains it there during the operation of the automatic stop mechanism.

As mentioned above, the phonograph can also be used as a semi-automatic single player by operating the control knob 113*a*. In such a case the control knob 113 is not used, and the phonograph is started by moving the control knob 113*a* from the position I*a* to the position II*a*. The lever 172 is thereby pushed lengthwise, and this movement is transmitted through the link 174 to the switch control arm 136 which is moved towards the right in the same manner as if it were pulled as a result of clockwise rotation of the start control arm 124. Due to the inclined portion of the notch where the pin 134 engages, manual operation will not result in swinging of the arm 124 so that the pin 134 will not be moved to engage the plate member 229 and thereby start the cam disc.

Accordingly start by manual control will result in switching on the motor and the main driving gear 103 only, so that the turntable starts to rotate. Thereafter the tone arm is lifted by hand, and lowered on the record supported on the turntable to engage the stylus in the initial sound groove.

When the playing of a record has been terminated the trip starter will be actuated as in the case of operation as a record changer by means of the rotating nose 231 which will push the trip starter arm 228 back so as to engage the pin 230 thereon against the arm 232 which again will cause initiation of the same movements as when the trip starter and plate member assembly 228, 229 have been moved under manual control during clockwise swinging of the arm 124.

It will be appreciated that when the phonograph is stopped as a result of automatic action or manually by rotating the knob 113 clockwise, the lever structure is so designed that the lever 172 will be pushed to its front position, i.e. when the manual control member 113*a* is in the position I*a* so that the phonograph can be started in any of the two manners described. Also when the phonograph is started by means of the automatic control knob 113 the manual control knob 113*a* will be moved to the position II*a*, and if the operator should move it back to position I*a* this will also result in stopping of the phonograph.

In the alternative embodiment of the friction link shown in FIGURE 6, reference numeral 300 designates the tone arm spindle on which a disc 302 is firmly secured, for example by being pressed on the spindle. The disc 302 has two projections which correspond to the abutments 278*a* and 278*b* in FIGURE 3 and, therefore, are designated by the same reference numerals. The friction link comprises the disc 302, a friction disc 304 arranged therebelow, and a second disc 306 engaging the friction disc 304.

The cam follower arm 194 has, as in the preceding embodiment, a disc or washer portion which surrounds the tone arm spindle and which by a pair of coupling members such as balls 310*a*, 310*b* which engage in aligning holes in the disc 306 and the disc 308 causes the disc 306 to rotate against the friction of the friction link when the track follower arm 194 is caused to swing. A pair of lugs 308*a* and 308*b* extend into the aperture of the disc portion 308 which in the embodiment shown in FIGURE 6 are located behind the coupling members 310*a*, 310*b*, as seen from the end of the cam follower arm 194.

Further, according to the embodiment of FIGURE 6, the spring arrangement which presses the parts of the friction link together is in the form of two leaf springs 312 and 316 of arcuate configuration. One leaf spring 312 which is upwardly convex is arranged above a plate member 314 which is connected to the arm 327 actuating the trip starter mechanism. The other spring 316 has a body portion of substantially flat configuration, and at each end a pair of lugs 316*a*, 316*b* which extend upwardly and when the friction link is assembled engage in oppositely located notches in the plate portion 314, the spring 312, and the disc portion 302. These lugs 316*a* and 316*b* are of resilient material and have at their top ends a head of increased width in comparison with the body portions of the lugs so that when the friction link is assembled, the lugs 316*a*, 316*b* are safely engaged in the notches, in such a manner that the head portions extend above the disc 302 and press the parts of the friction link together with a bias governed by the tension of the spring member 312. Between the top side of this spring member 312 and the inwardly extending lugs 308*a*, 308*b* a washer 318 is interposed.

At the rear end the disc 308 has a projection 308*c* with a screw- threaded hole for receiving a screw 309, the end of which abuts against a projection 306*c* on the disc 306 so as thereby to adjust the lower position of the cam follower at the end of the arm 194 to enable play between the cam follower and the bottom of the playing recess of the cam disc.

It will be appreciated that the assembly of the friction link according to the embodiment of FIGURE 6 is extremely simple and does not require any tools with the exception of the tooling operation necessary to press the disc 302 on the tone arm spindle.

A still further possible modification of a friction link according to the invention is shown in FIGURE 7. In this embodiment the tone arm spindle is designated by 330. The tone arm spindle has an annular groove 332 for receiving a spring washer 334. Below this washer a double ball bearing 336 is arranged, the bottom of which is engaged by the top of a helical spring 338, the lower end of which engages a washer 340 which is pressed down by the spring to engage a pair of lugs 342*a*, 342*b* extending inwardly in a hole in a ring member 342 connected with the cam follower arm 194. Below the cam follower arm 194, the friction disc structure is provided in the form of a disc or washer 344 which by means of a pair of coupling members 346*a*, 346*b* is coupled to the disc 342. The friction link further includes a friction washer 348 and a disc and arm structure 350, 352 of which the arm 352 is the actuating arm for the trip starter. The disc structure 350 is non-rotatably secured by means of one or a plurality of screws 354 on the tone arm spindle 330. In this embodiment the adjustment screw 356 is arranged in a hole in the disc portion 342 adjacent the cam follower arm 194 so as to engage against the top side of the disc 344.

It will be appreciated that though in the foregoing I have described various modifications of the friction link according to the invention, still further modifications will be possible within the scope of the invention.

Also with respect to the detailed design of the phonograph described it will be appreciated that this phonograph structure must be considered as an example only within the scope of my invention and that various other modifications of the control mechanism, the driving gear therefor, the trip starter, and other elements of the structure will be possible along the lines of the disclosure of the specification of copending applications referred to hereinabove.

With respect to the friction link it will be appreciated that one advantage of providing the cam follower arm 194 tiltable is that a movement of the cam follower pin perpendicular to the plane of the cam disc can be allowed to cause the cam follower to climb an inclined wall of a track without the necessity for guiding the pin resiliently in the axial direction.

Another advantage of the tiltable arrangement of the cam follower arm 194 is that the tilting of this arm may be effected under manual control, for example in order to by-pass one or more tracks of the cam disc.

For example, it will be possible within the scope of my invention to provide the phonograph with a repeat push button which, when depressed by means of a suitable lever, tilts the cam follower arm 194 to disengage the cam follower entirely from the cam disc during such part of its rotation which otherwise would cause the cam follower to be guided outwardly in the track 200, the depression of the same repeat push button could be caused to move another lever in engagement with the raising lever 250 to prevent the raising lever from tilting to such an extent that the tone arm is raised to its top position. Thereby the tone arm would be controlled in a level below the next record, and accordingly neither this record would be tested with respect to size, nor would the previously preset position of the cam follower arm 194 and the tone arm be changed so that it would be possible to repeat the playing of the record which has already been played, supposing that still another lever system also prevents dropping of the next record. In the case of such an embodiment the cam disc will have to be provided with one or more further abutments causing the repeat push button to be released and the levers moved to their operative position upon depression of the repeat push button to be re-set to their inoperative position substantially at the point of rotation of the cam disc which would cause reengagement between the cam follower and the cam tracks adjacent the interior end of the track 204.

I claim:

1. In a phonograph having a tone arm structure including a tone arm spindle, stylus means and a feeler abutment, electric drive means and an energizing circuit for said drive means including switch means, and a control mechanism for moving said tone arm after each playing of a record, in combination a cam follower structure including a cam follower arm provided with a track follower, frictional connecting means frictionally connecting said cam follower arm with said tone arm spindle to normally provide movement thereof in unison while also enabling relative movement therebetween upon the occurrence of a predetermined force and to simultaneously enable said cam follower arm to tilt in a plane extending through the geometrical axis of said tone arm, cam means for engagement by said track follower having at least one feeler control track portion forming a first track portion for moving said cam follower arm to swing said tone arm for engagement of said follower abutment against the edge of the next record to be played and to thereby swing said cam follower arm relative to said tone arm spindle against the friction of said frictional connecting means during continued movement of said track follower in said first track portion so as to cause further movement thereof to respond to the size of said record, and a second outwardly leading track portion in said cam means and including a sloping wall portion leading from said second track portion to a cam surface portion for thereafter swinging said cam follower arm and therewith said tone arm outwardly to enable free drop of said record, means in said phonograph and operative to obstruct said outward movement of said tone arm during engagement of said track follower in said outwardly leading second track portion to thereby cause said track follower to climb said sloping wall portion by tilting said cam follower arm within said plane and therewith leave said second track portion upon obstruction of the movement of said tone arm, said cam means further including track means operable to guide said track follower and therewith said cam follower arm and said tone arm inwardly after the record has been dropped to thereby land said tone arm with the stylus means thereof in the initial sound track of said last-mentioned record, trip starter means for controlling said cam means to initiate movement thereof after each play of a record, means operatively connected with said cam means to retain the same in a predetermined position during the playing of a record, manually operable control means including start-and-stop lever means operative upon movement in one direction to open said switch means and upon movement in another direction to close said switch means and simultaneously therewith to actuate said trip starter means, and alternate manual control means operatively connected with said start-and-stop lever means and operative to close said switch means upon movement in one of said two directions.

2. In a phonograph having a tone arm structure including a tone arm spindle, stylus means and a feeler abutment, electric drive means and an energizing circuit for said drive means including switch means, and a control mechanism for moving said tone arm after each playing of a record, in combination a cam follower structure including a cam follower arm provided with a track follower, frictional connecting means frictionally connecting said cam follower arm with said tone arm spindle to normally provide movement thereof in unison while also enabling relative movement therebetween upon the occurrence of a predetermined force and to simultaneously enable said cam follower arm to tilt in a plane extending through the geometrical axis of said tone arm, cam means for engagement by said track follower having at least one feeler control track portion forming a first track portion for moving said cam follower arm to swing said tone arm for engagement of said follower abutment against the edge of the next record to be played and to thereby swing said cam follower arm relative to said tone arm spindle against the friction of said frictional connecting means during continued movement of said track follower in said first track portion so as to cause further movement thereof to respond to the size of said record, and a second outwardly leading track portion in said cam means and including a sloping wall portion leading from said second track portion to a cam portion for thereafter swinging said cam follower arm and therewith said tone arm outwardly to enable free drop of said record, means in said phonograph and operative to obstruct said outward movement of said tone arm during engagement of said track follower in said outwardly leading second track portion to thereby cause said track follower to climb said sloping wall portion by tilting said cam follower arm within said plane and therewith leave said second track portion upon obstruction of the movement of said tone arm, said cam means further including track means operable to guide said track follower and therewith said cam follower arm and said tone arm inwardly after the record has been dropped to thereby land said tone arm with the stylus means thereof in the initial sound track of said last-mentioned record, trip starter means for controlling said cam means to initiate movement thereof after each playing of a record, means operatively connected with said cam means to retain the same in a predetermined position during the playing of a record, and manually operable control means including start-and-stop lever means operative upon movement in one direction to open said switch means and simultaneously therewith to actuate said trip starter means.

3. In a phonograph having a tone arm structure including a tone arm spindle, stylus means and a feeler abutment, and a control mechanism for moving said tone arm after each playing a record, in combination a cam follower structure including a cam follower arm provided with a track follower, frictional connecting means frictionally connecting said cam follower arm with said tone arm spindle to normally provide movement thereof in unison while also enabling relative movement therebetween upon the occurrence of a predetermined force and to simultaneously enable said cam follower arm to tilt in a plane extending through the geometrical axis of said tone arm, cam means for said track follower having at least one feeler control track portion constituting a first track portion for moving said cam follower arm to swing said tone arm for engagement of said follower abutment against the edge of the next record to be played and to thereby swing said cam follower arm relative to said tone arm spindle against the friction of said frictional connecting means during continued movement of said track follower in said first track portion so as to cause further movement thereof to respond to the size of said record, and a second outwardly leading track portion in said cam means including a sloping wall portion leading from said second track portion to another cam surface portion for thereafter swinging said cam follower arm and therewith said tone arm outwardly to enable free drop of said record, means in said phonograph and operative to obstruct said outward movement of said tone arm during engagement of said track follower in said outwardly leading second track portion to thereby cause said track follower to climb said sloping wall portion by tilting said cam follower arm within said plane and therewith leave said second track portion upon obstruction of the movement of said tone arm, said cam means further including track means operable to guide said track follower and therewith said cam follower arm and therewith said tone arm inwardly after the record has been dropped to thereby land said tone arm with the stylus means thereof in the initial sound track of said last-mentioned record, trip starter means for controlling said cam means to initiate movement thereof after each playing of a record, and means operatively connected with said cam means to retain the same in a predetermined position during the playing of a record.

4. In a record-changing phonograph having a tone arm structure provided with a stylus adapted to carry out swinging movements during the record change cycle and to test the size of the next record to be played by engaging the edge thereof during inward swinging movement thereof, the combination comprising swingingly mounted tone arm spindle means adapted to support thereon said tone arm structure for rotation in unison therewith, cam follower means, means frictionally connecting said cam follower means with said tone arm spindle means to normally swing the same in unison about the axis of said tone arm spindle means while enabling relative rotary movement therebetween upon the occurrence of a force in excess of the friction force exerted by said frictional connecting means, and control means for controlling said swinging movements including cam means operatively connected with said tone arm spindle means over said cam follower means and having a first track portion for guiding said cam follower means and therewith said tone arm spindle means in such a way as to swing said tone arm structure into engagement with the next record to be played to test the same for size, a second track portion provided with a sloping wall portion for guiding said cam follower means and therewith said tone arm spindle means in such a way as to swing said tone arm structure outwardly, and a third track portion for guiding said cam follower means and therewith said tone arm spindle means in such a way as to land said tone arm structure with the stylus thereof in the correct position with respect to said next record, and means in said phonograph for effectively obstructing the outward movement of said tone arm structure caused by said second track portion in dependence on the tested size of the next record to be played to thereby force said cam follower means to leave said second track portion by climbing said sloping wall portion and reach said third track portion over said surface portion at a point corresponding to the tested size.

5. In a record-changing phonograph having a tone arm structure provided with a stylus adapted to carry out swinging movements during the record change cycle and to test the size of the next record to be played by engaging the edge thereof during inward swinging movement thereof, the combination comprising swingingly mounted tone arm spindle means adapted to support thereon said tone arm structure for rotation in unison therewith, cam follower means, means frictionally connecting said cam follower means with said tone arm spindle means to normally swing the same in unison about the axis of said tone arm spindle means while enabling relative rotary movement therebetween upon the occurrence of a force in excess of the friction force exerted by said frictional connecting means and also relative tilting movement of said cam follower means essentially in a plan including said axis, and control means for controlling said swinging movements including cam means operatively connected with said tone arm spindle means over said cam follower means and having a first track portion for guiding said cam follower means and therewith said tone arm spindle means in such a way as to swing said tone arm structure into engagement with the next record to be played to test the same for size and therewith preset said tone arm spindle means relative to said cam follower means corresponding to the tested size, a second track portion provided with a sloping wall portion leading from said second track portion to a cam surface portion for guiding said cam follower means and therewith said tone arm spindle means in such a way as to swing said tone arm structure outwardly, and a third track portion for guiding said cam follower means and therewith said tone arm spindle means in such a way as to land said tone arm structure with the stylus thereof in the correct position with respect to said next record, and means in said phonograph for effectively obstructing the outward movement of said tone arm structure caused by said second track portion in dependence on the tested size of the next record to be played to thereby force said cam follower means to leave said second track portion by climbing said sloping wall portion and reach said third track portion over said surface portion at a point corresponding to the tested size.

6. In a record-changing phonograph, the combination according to claim 5, wherein said cam means includes a playing recess to enable said cam follower means and therewith said tone arm structure supported by said tone arm spindle means to move freely during playing of a record, and presetting means operative to preset the relative angular position between said tone arm spindle means and said cam follower means prior to engagement of said first track portion by the latter.

7. In a record-changing phonograph, the combination according to claim 6, further comprising stop control means, and wherein said cam means includes a stop control track portion connected with the end of said second track portion to guide said cam follower means into engagement with said stop control means to engage the same in the absence of any next record to be played.

8. In a record-changing phonograph having a tone arm structure provided with stylus means and with a feeler abutment, cam follower means operatively connected with said tone arm structure for swinging the same between each playing of a record, a turntable, electric drive means for driving said turntable including switch means, and support means for a stack of records to be sequentially supplied from said support means to said turntable, comprising in combination: rotatably-supported disc-like, change-cycle cam means for said cam follower means enabling said cam follower means to move freely during the playing of a record and provided with track means for selectively guiding said cam follower means and thereby swing said tone arm structure, said track means including a first track portion for bringing said feeler abutment on said tone arm into engagement against the edge of the next record to be supplied from said support means to said turntable to measure the size of said next record, a second track portion for moving said tone arm structure outwardly after the size of said next record has been measured to enable the same to be supplied to said turntable, and a third track portion for landing said tone arm with the stylus means thereof correctly on said next record after it has been supplied to said turntable, said cam follower means including a cam follower arm engaging said track means, frictional connecting means frictionally connecting said cam follower arm with said tone arm structure to enable relative movement of the former with respect to the latter during a part of the change cycle and to thereby enable the movement of said tone arm structure to correspond to the size of the record measured, means operative to preset the mutually relative positions between said cam follower arm and said tone arm structure during a part of said change cycle prior to engagement of said feeler abutment against the edge of said next record, selectively engageable drive means for selectively driving said cam means, stop means for stopping said cam means in a predetermined position during playing of a record with said selectively engageable drive means disengaged and trip starter means operatively connected with said selectively engageable drive means to control engagement thereof after termination of the playing of a record.

9. In a record-changing phonograph, the combination according to claim 8, further comprising first manually operable start-and-stop control means operatively connected with said switch means and with said trip starter means to close said switch means upon movement of said start-and-stop control means in the start direction and to simultaneously actuate said trip starter means to engage said selectively engageable drive means, and second manually operable start control means for enabling said phonograph to be used as a single recordplayer and operatively connected with said switch means to close the latter upon movement of said second manually operable start control means to the start position thereof, and stop control means on said cam means adapted to be engaged by and operative upon movement of said cam follower arm in response to the absence of any next record on said support means.

10. In a record-changing phonograph, the combination according to claim 9, wherein said switch means includes a switch control lever, said first manually operable control means including a first control member operable at will, a first movable control lever operatively connected with said first control member, and lost-motion connecting means operatively connecting said first movable control lever with said switch control lever to enable said switch control lever to move in the closing direction thereof without actuating said first control lever, said second manually operable control means including a second control lever operatively connected with said switch control lever to close said switch means upon operation of said second manually operable control means.

11. In a record-changing phonograph, the combination according to claim 9, wherein said cam means is provided with a playing recess to enable said cam follower means to move freely during the playing of a record, the engagement of said feeler abutment against the edge of said next record effectively stopping further inward movement of said tone arm structure while said cam follower means continues its movement as determined by said first track portion to thereby effectively assure the correspondence between the size of said next record and the further movement of said tone arm structure during the remaining change cycle, said third track portion merging in said playing recess, said frictional connecting means also enabling movement of said cam follower arm in a direction essentially perpendicular to the surface of said cam means, and said second track portion including a ramp upon which said cam follower arm climbs upon resistance to the swinging movement of said tone arm structure.

12. In a record-changing phonograph, the combination according to claim 11, wherein said stop control means on said cam means includes an outermost stop track portion effectively connecting the end of said second track portion with said playing recess and operative to guide said cam follower arm in case said mutually relative preset positions between said tone arm structure and said cam follower means remains undisturbed during engagement of the latter with said first track portion, and a swingingly arranged stop control arm on said cam means having a first portion movable into the path of said stop control track portion adjacent the point where it merges into said playing recess and adapted to be engaged by said cam follower arm, and means operatively connecting said stop control arm with said first movable control lever to thereby open said switch means.

13. In a record-changing phonograph, the combination according to claim 12, wherein said selectively engageable drive means includes a movable supporting structure, and a driving gear wheel supported by said movable supporting structure and adapted to be selectively engaged with said cam-like disc means by selective movement of said supporting structure, an abutment on said cam means operative to engage a portion of said movable supporting structure for retaining the same in the disengaged position thereof with said cam means in a position corresponding to the record playing position thereof, said trip starter means including a continuously rotating abutment structure, trip starter link means operatively connected with said tone arm structure to approach the path of said continuously rotating abutment structure upon radially inward movement of said tone arm structure, and means operatively connecting said trip starter means with said movable supporting structure to displace the latter upon actuation of said trip starter means into disengagement thereof with respect to said first-mentioned abutment so as to cause engagement of said driving gear wheel with said cam means to rotate the latter.

14. In a phonograph having a tone arm structure including a tone arm spindle, stylus means and a feeler abutment on the tone arm and a control mechanism for moving the tone arm after each playing of a record in combination: a cam follower structure including a cam follower arm provided with a track follower and connected with the tone arm spindle through a friction link to swing about the tone arm spindle, said cam follower arm also being mounted to tilt in a plane through the geometrical axis of the tone arm spindle, cam means for said track follower having at least one feeler control track for guiding said cam follower arm to swing the same and therewith said tone arm to engage its feeler abutment against the edge of the next record to be played and to swing said cam follower arm against the friction of said friction link so as to cause further movement of said tone arm to respond to the size of said record, and said cam means further including an outwardly leading track portion provided with a sloping wall portion for thereafter swinging said tone arm outwardly to enable free drop of said record, means operable to obstruct said outward movement of said tone arm to thereby force said track follower to climb said sloping wall portion and thereby enable said track follower to leave said track when the movement of the tone arm is obstructed by tilting said cam follower arm.

15. In a phonograph having a tone arm structure including a tone arm spindle, stylus means and a control mechanism for moving the tone arm after each playing of a record in combination: a cam follower structure including a cam follower arm connected with the tone arm spindle through a friction link to swing about the tone arm spindle, said cam follower arm also being mounted to tilt in a plane through the geometrical axis of the tone arm spindle, a cam member having a surface portion and at least one track for moving said cam follower arm to swing the tone arm, said track being provided with a sloping wall portion leading from said track to said surface portion, means operable to obstruct the swinging movement of the tone arm and therewith to cause said track follower to climb said sloping wall portion toward said surface portion and therewith effectively leave said track when the movement of the tone arm is obstructed by tilting said cam follower arm.

16. In a phonograph having a tone arm structure including a tone arm spindle, stylus means and a control mechanism for moving the tone arm after each playing of a record in combination: a cam follower structure including a cam follower arm connected with the tone arm spindle operable to swing about said tone arm spindle when guided for swinging movement, said cam follower arm also being mounted to tilt in a plane through the geometrical axis of the tone arm spindle, a cam member having at least one track provided with a sloping wall portion for moving said cam follower arm to swing the tone arm, means operable to obstruct the swinging movement of said tone arm and thereby force said track follower to climb said sloping wall portion and therewith leave said track when the movement of the tone arm is obstructed by tilting said cam follower arm.

17. A tone arm spindle structure for use in an automatic phonograph including in combination: an elongated tone arm shaft, a friction disc structure surrounding said shaft including a first disc mounted on said tone arm shaft to rotate therewith as well as being prevented from axial displacement in at least one direction and a disc mounted for rotation about said tone arm shaft, a cam follower structure including a cam follower arm and a disc portion arranged with said disc portion in spaced relationship to said rotatable disc of said friction disc structure, coupling means extending in the space between said disc portion of said cam follower structure and said rotatable disc of said friction disc structure to enable said cam follower arm to tilt perpendicularly to the plane of its disc and coupling said discs together, a spring structure operable to press said discs together, a disc member spaced from said cam follower arm disc and mounted on said tone arm shaft, means preventing said disc member from being axially displaced on said tone arm shaft in at least one direction away from said disc structure, a spring interposed between said disc member and said cam follower arm disc operable to press the latter against said friction disc structure as well as to press the discs of said friction disc structure together, means for retaining said cam follower arm so as to extend in a predetermined plane when said discs are pressed together by said spring, and a pair of members extending between said disc member and said first disc of said friction disc structure for defining a mutual space between said discs and cause said spring to be tensioned.

18. A tone arm spindle structure for use in an automatic phonograph including in combination: an elongated tone arm shaft, a friction disc structure surrounding said shaft including a first disc mounted on said tone arm shaft to rotate therewith as well as being prevented from axial displacement in at least one direction and a disc mounted for rotation about said tone arm shaft, a cam follower structure including a cam follower arm and a disc portion arranged with said disc portion in spaced relationship to said rotatable disc of said friction disc structure, coupling means extending in the space between said disc portion of said cam follower structure and said rotatable disc of said friction disc structure allowing said cam follower arm to tilt perpendicularly to the plane of its disc and coupling said discs together, a spring structure operable to press said discs together, a disc member spaced from said cam follower arm disc and mounted on said tone arm shaft, means preventing said disc member from being axially displaced on said tone arm shaft in at least one direction away from said disc structure, a spring interposed between said disc member and said cam follower arm disc operable to press the latter against said friction disc structure as well as to press the discs of said friction disc structure together, means for retaining said cam follower arm so as to extend in a predetermined plane when said discs are pressed together by said spring, and means connecting said disc member with said first disc of said friction disc structure operable to retain said discs in mutual spaced relationship caused by the tension of said spring.

19. A tone arm spindle structure for use in an automatic phonograph including in combination: an elongated tone arm shaft, a friction disc structure surrounding said shaft including a first disc mounted on said tone arm shaft to rotate therewith as well as being prevented from axial displacement in at least one direction and a disc mounted for rotation about said tone arm shaft, a cam follower structure including a cam follower arm and a disc portion arranged with said disc portion in spaced relationship to said rotatable disc of said friction disc structure, coupling means extending in the space between said disc portion of said cam follower structure and said rotatable disc of said friction disc structure to enable said cam follower arm to tilt perpendicularly to the plane of its disc and coupling said discs together, a spring structure operable to press said discs together, a disc member spaced from said cam follower arm disc mounted on said tone arm shaft, means preventing said disc member from being axially displaced on said tone arm shaft in at least one direction away from said disc structure, a spring interposed between said disc member and said cam follower arm disc operable to press the latter against said friction disc structure as well as to press the discs of said friction disc structure together, and means for retaining said cam follower arm so as to extend in a predetermined plane when said discs are pressed together by said spring.

20. A tone arm spindle structure for use in an automatic phonograph including in combination: an elongated tone arm shaft, a friction disc structure surrounding said shaft including a first disc mounted on said tone arm shaft to rotate therewith as well as being prevented from axial displacement in at least one direction and a disc mounted for rotation about said tone arm shaft, a cam follower structure including a cam follower arm and a disc portion arranged with said disc portion in spaced relationship to said rotatable disc of said friction disc structure, coupling means extending in the space between said disc portion of said cam follower structure and said rotatable disc of said friction disc structure to enable said cam follower arm to tilt perpendicularly to the plane of its disc and coupling said discs together, a spring structure operable to press said discs together, an abutment member engaging a part of said spring structure for tensioning said spring, and an adjustment member for regulating the plane in which said cam follower arm is allowed to swing about said tone arm shaft.

21. A tone arm spindle structure for use in an automatic phonograph including in combination: an elongated tone arm shaft, a friction disc structure surrounding said shaft including a first disc mounted on said tone arm shaft to rotate therewith as well as being prevented from axial displacement in at least one direction and a disc mounted for rotation about said tone arm shaft, a cam follower structure including a cam follower arm and a disc portion arranged with said disc portion in spaced relationship to said rotatable disc of said friction disc structure, coupling means extending in the space between said disc portion of said cam follower structure and said rotatable disc of said friction disc structure to enable said cam follower arm to tilt perpendicularly to the plane of its disc and coupling said discs together, a spring structure operable to press said discs together, and an abutment for tensioning said spring.

22. A tone arm spindle structure for use in an automatic phonograph including in combination: a tone arm shaft, a friction disc structure surrounding said shaft including a disc fast on said tone arm shaft and a disc mounted for rotation about said tone arm shaft, a cam follower structure including a cam follower arm and a disc portion arranged with said disc portion on said tone arm shaft in spaced relationship to said rotatable disc of said friction disc structure, opposite aligning positioning holes in said disc portion of said cam follower structure and in said rotatable disc of said friction disc structure, a pair of ball members partly extending in said holes of said discs to couple them together to enable said cam follower arm to swing relatively to said tone arm spindle against the friction between the discs of said friction disc structure as well as to enable said cam follower arm to tilt in a plane through the geometrical axis of said tone arm spindle, an abutment member on said tone arm shaft spaced from said cam follower disc, a spring structure interposed between said abutment member and said disc structure for pressing the discs thereof together, and at least one abutment on said cam follower disc to be engaged by said spring structure for biasing said cam follower arm.

23. A tone arm spindle structure for use in an automatic phonograph including in combination: a hollow tone arm shaft, a friction disc structure surrounding said shaft including a disc fast on said tone arm shaft and a disc mounted for rotation about said tone arm shaft, a cam follower structure including a cam follower arm and a disc portion arranged with said disc portion in spaced relationship to said rotatable disc of said friction disc structure, a pair of opposite holes in said disc portion of said cam follower structure substantially symmetrically arranged relatively to the geometrical axis of said cam follower arm, a pair of holes in said rotatable disc of said friction disc structure opposite said holes in said cam follower disc, a pair of ball members partly extending in said holes of said discs to couple them together, an abutment member spaced from said cam follower disc, a spring structure interposed between said abutment member and said disc structure for pressing the discs thereof together, and at least one abutment on said cam follower disc in spaced relationship to a line connecting said holes therein in engagement with said spring structure.

24. A tone arm spindle structure for use in an automatic phonograph, including in combination: a hollow tone arm shaft, a friction disc structure surrounding said shaft including a first disc mounted for rotation with said tone arm shaft and prevented from being axially displaced on said tone arm shaft, a second disc of frictional material engaging one surface of said first disc, a third disc engaging the other side of said friction disc and mounted for rotation about said tone arm shaft, a cam follower structure including a cam follower arm and a disc portion which is arranged in spaced relationship to said rotatable disc of said friction disc structure, coupling means interposed between said cam follower disc and said friction disc operable to cause said friction disc to rotate about said tone arm spindle when said cam follower arm is swung as well as to enable said cam follower arm to tilt substantially in a plane through the geometrical axis of said tone arm spindle, and a resilient structure operable to press said disc structure together.

25. As an article of manufacture, a tone arm spindle assembly for use in an automatic phonograph including in combination: a tone arm shaft and disc structure including a disc mounted for rotation with said tone arm shaft and prevented from being axially displaced on said tone arm shaft, a friction disc engaging one surface of said first disc, a disc arranged on the other side of said friction disc and mounted for rotation about said tone arm shaft, a cam follower structure including a disc portion arranged in spaced relationship to said rotatable disc coupling means for coupling together said disk portion and said rotatable disk, said disc portion of said cam follower structure having at least one abutment in spaced relationship to said coupling means, and a resilient structure operable to press said disc structure together and tilt said cam follower arm structure to assume a predetermined position.

References Cited in the file of this patent

UNITED STATES PATENTS

| | | |
|---|---|---|
| 2,397,932 | Erwood et al. | Apr. 9, 1946 |
| 2,584,257 | Cain | Feb. 5, 1952 |
| 2,616,703 | Leonard | Nov. 4, 1952 |
| 2,637,558 | Fisher | May 5, 1953 |
| 2,818,263 | Dale | Dec. 31, 1957 |
| 2,868,547 | Vistain | Jan. 13, 1959 |